(12) United States Patent
Ashikawa

(10) Patent No.: US 6,821,469 B2
(45) Date of Patent: Nov. 23, 2004

(54) METHOD OF MANUFACTURING A ROLLER

(75) Inventor: Teruo Ashikawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 161 days.

(21) Appl. No.: 10/190,830

(22) Filed: Jul. 9, 2002

(65) Prior Publication Data

US 2003/0009885 A1 Jan. 16, 2003

(30) Foreign Application Priority Data

Jul. 12, 2001 (JP) ........................................ 2001-211614

(51) Int. Cl.$^7$ .......................... B29C 45/16; B29C 45/40; B29C 65/70; B21K 1/02
(52) U.S. Cl. ....................... 264/255; 264/267; 264/296; 264/318; 264/336; 425/112; 425/127; 425/129.1; 425/436; 425/556; 425/DIG. 58; 249/74; 249/136
(58) Field of Search ................................ 264/255, 267, 264/296, 318, 336; 425/112, 127, 129.1, 438, 556, DIG. 58; 249/74, 136

(56) References Cited

U.S. PATENT DOCUMENTS

| | | | | |
|---|---|---|---|---|
| 3,244,788 A | * | 4/1966 | Michel et al. | 264/267 |
| 3,587,156 A | * | 6/1971 | Sorenson | 29/890.127 |
| 3,703,571 A | * | 11/1972 | Roberts | 264/46.6 |
| 3,987,144 A | * | 10/1976 | Nickold | 264/318 |
| 4,101,626 A | * | 7/1978 | Takahashi et al. | 264/313 |
| 4,399,092 A | * | 8/1983 | Snow et al. | 264/318 |
| 5,490,966 A | * | 2/1996 | Peterson et al. | 264/318 |
| 5,538,678 A | * | 7/1996 | Ishikawa | 264/255 |
| 5,662,850 A | * | 9/1997 | Konno et al. | 264/162 |
| 5,910,280 A | * | 6/1999 | Deason | 264/296 |
| 6,595,450 B2 | * | 7/2003 | Asano et al. | 242/346.2 |
| 2001/0054663 A1 | * | 12/2001 | Asano et al. | 242/346.2 |
| 2003/0034414 A1 | * | 2/2003 | Asano et al. | 242/346.2 |
| 2003/0075634 A1 | * | 4/2003 | Asano et al. | 242/346.2 |

FOREIGN PATENT DOCUMENTS

| | | |
|---|---|---|
| DE | 31 27 340 A1 | 4/1982 |
| DE | 43 20 680 C1 | 1/1995 |
| JP | 60 195756 A | 10/1985 |
| JP | 08-235823 A * | 9/1996 ......... G11B/23/113 |

OTHER PUBLICATIONS

Machine translation of JP 08–235823 A, 2004, Japanese Patent Office website.*

* cited by examiner

Primary Examiner—Michael P. Colaianni
Assistant Examiner—Michael I. Poe
(74) Attorney, Agent, or Firm—Sughrue, Mion, PLLC

(57) ABSTRACT

A method of manufacturing a roller includes: forming a hollow cylindrical body that includes a fully solidified outer peripheral surface and a semi-solidified interior, with an inner peripheral surface swelling inwardly; and pressing the swollen portion of the inner peripheral surface outwardly by pulling an insert die from the semi-solidified cylindrical body, to thereby allow the outer periphery of the cylindrical body to swell outwardly in a barrel-like manner. A primary molded product including a through hole along a central axis is thereby formed, and a secondary resin is injected into the through hole of the primary molded product.

17 Claims, 11 Drawing Sheets

METHOD OF MANUFACTURING A ROLLER

BACKGROUND OF THE INVENTION

1. Field of the Invention

The present invention relates to a method of manufacturing a roller for guiding a tape. More particularly, the invention relates to a method of manufacturing a barrel-shaped roller including an outer periphery that swells at an intermediate portion thereof.

2. Description of the Related Art

Generally, in audio and video apparatus, a magnetic tape is often used to record and play back information. The magnetic tape is wound around a pair of reels and conveyably retained within a cassette case.

For example, as shown in FIG. 8, a magnetic tape cassette 100 employed for business use at a broadcasting station includes an upper half 102 and a lower half 104 that form a case. A pair of reels 109 is rotatably supported inside the case. Each reel comprises a lower flange 105, a hub 106 that is integrally fixed to an upper portion of the lower flange 105. Each reel comprises, and an upper flange 108 that is mounted to an upper portion of the hub 106. A magnetic tape T is wound around the pair of the reels 109.

A guide roller 114 for guiding the magnetic tape T when the magnetic tape T is played or rewound is provided in the vicinity of an opening at the front side of the magnetic tape cassette 100. The guide roller 114 is rotatably supported by a shaft 110 that is generally supported from below by the lower half 104.

The guide roller 114 includes an outer periphery whose intermediate portion swells like a barrel in order to ensure traveling stability of and efficiently guide the magnetic tape T.

The guide roller 114 is manufactured in accordance with the procedures described below in order to prevent a parting line (PL) from being formed on the surface of the guide roller 114.

First, as shown in FIGS. 9A and 9B, a cylindrical primary molded product 118 is formed by injection-molding.

Next, as shown in FIG. 10, molten resin M for secondary molding is injected into the interior of the primary molded product 118. As shown in FIG. 11, the primary molded product 118 swells due to pressure exerted by the molten resin M, whereby the primary molded product 118 is formed into a barrel shape. The injected molten resin M and the primary molded product 118 are molded integrally with each other to form a secondary molded product. Consequently, a barrel-shaped guide roller 114 is formed (see FIG. 8).

However, setting the thickness, diameter, and molding temperature of the primary molded product 118 is difficult when the primary molded product 118 is swollen by molten resin M being injected therein. There has thus been a strong demand for an easy and efficient method of manufacturing barrel-shaped rollers.

This demand is not limited to barrel-shaped rollers used for magnetic tape cassettes, but includes general-use rollers that are formed into a barrel shape and used for guiding a tape.

SUMMARY OF THE INVENTION

In view of the aforementioned facts, an object of the present invention is to provide a method by which an excellent barrel-shaped roller can be easily manufactured.

A first aspect of the present invention is a method of manufacturing a roller including an outer periphery that swells in a barrel-like manner, comprising the steps of: (a) forming a hollow cylindrical body that includes a uniform outer peripheral surface and an inner peripheral surface that swells inwardly; and (b) pressing the swollen portion of the inner peripheral surface outwardly.

Accordingly, a parting line is not formed on a roller surface, whereby an excellent barrel-shaped roller can be easily manufactured.

In the method of the first aspect, the cylindrical body is molded with an insert die, which includes a central portion having formed thereat a curved recess, and an outer mold, which includes an inner peripheral surface that defines an outer periphery of a cavity formed by joining the outer mold with the insert die, the inner peripheral surface of the outer mold being uniformly flat.

When the roller is formed by injection-molding, the aforementioned cylindrical body is molded with an insert die, which includes a central portion having formed thereat a curved recess, and an outer mold, which includes an inner peripheral surface that defines an outer periphery of a cavity formed by joining the outer mold with the insert die, the inner peripheral surface of the outer mold being uniformly flat.

Namely, resin is injected in a cavity defined by the insert die and the outer mold. Then, the outer mold is released in a state in which the cylindrical body is semi-solidified. Further, the cylindrical body is pulled from the insert die to press the swelling portion outwardly towards the outer periphery of the cylindrical body. Therefore, the inwardly swelling portion is pressed to thereby swell the outer periphery of the semi-solidified roller equal to the volume of the resin remaining at the inwardly swelling portion.

The timing at which the semi-solidified roller is pulled from the insert die is determined by considering the material of the resin to be injected, and the entire dimension and thickness of the roller obtained by molding. However, the timing is generally determined by pulling the cylindrical body from the insert die when a skin layer of solidified injected resin is formed. Consequently, it may be easy to form the outer periphery of the semi-solidified roller in a barrel-like manner.

Further, in the method of the first aspect, further comprises injecting resin into the hollow portion of the cylindrical body after step (b).

After molding the primary molded product by swelling the outer periphery of the cylindrical body into a barrel-like manner, resin can be injected into the hollow portion of the primary molded product to mold the secondary molded product. Accordingly, the interior of the through hole of the primary molded product can be formed into a desired shape.

A second aspect of the present invention is a method of manufacturing a roller including an outer periphery that swells in a barrel-like manner, the method using an insert die and an outer mold, the outer mold including an inner peripheral surface that defines an outer periphery of a cavity formed by joining the outer mold with the insert die, with the inner peripheral surface of the outer mold being cylindrical and uniformly flat, the method comprising the steps of: (a) injecting resin material into the cavity and disposing the resin material along an outer peripheral surface of the insert die to thereby form a hollow cylindrical body that includes a uniform outer peripheral surface and an inner peripheral surface including a portion that swells inwardly; (b) releasing the outer mold; and (c) pressing the swollen portion of the inner peripheral surface outwardly.

DESCRIPTION OF THE PREFERRED EMBODIMENT

Figure 1:
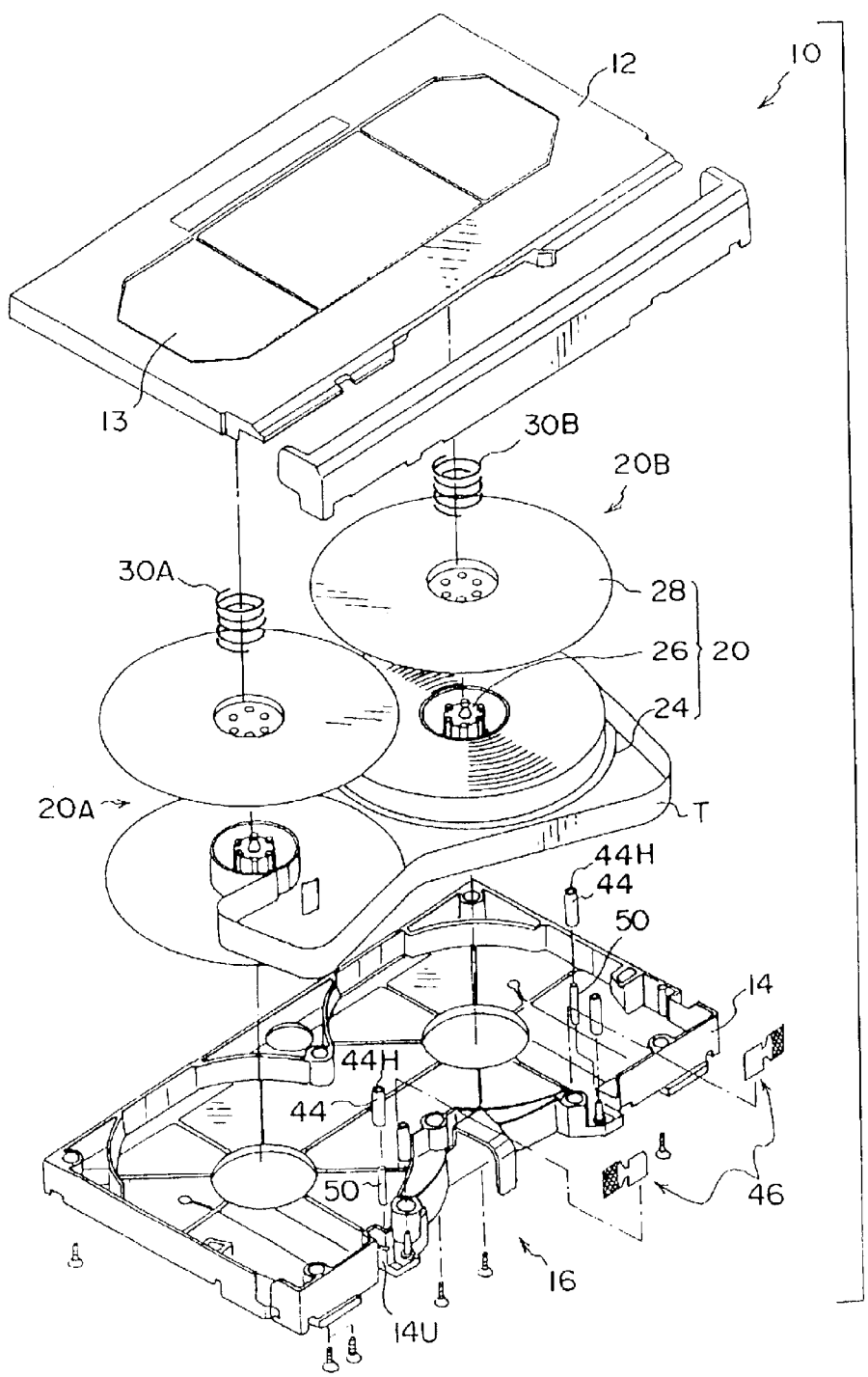
FIG. 1 is a developed perspective view of a magnetic tape cassette according to an embodiment of the present invention.

Description of an embodiment of the present invention will now be given. As shown in FIG. 1, a magnetic tape cassette (betacam L cassette) 10 that is used for business use by a broadcasting station includes an upper half 12 and a lower half 14 that form a case.

A pair of reels 20 is rotatably supported inside the case. Each of the pair of reels 20 has a lower flange 24, a hub 26 that is integrally fixed to an upper portion of the lower flange 24, and an upper flange 28 that is mounted to an upper portion of the hub 26. A magnetic tape T is wound around the reels 20. A window 13 made by a clear plate is disposed at the upper half 12.

A pair of compression coil springs 30A and 30B is interposed between the upper half 12 and the pair of reels 20. The compression coil springs 30A and 30B urge the corresponding reels 20A and 20B toward the lower half 14.

A pair of guide rollers 44 is disposed in the vicinity of an opening 16 at the front side of the magnetic tape cassette 10 to guide the magnetic tape T when it is played or rewound.

The magnetic tape cassette 10 includes tape pads 46 that slidably contact and press an undersurface of the magnetic tape T with an appropriate urging force to thereby prevent magnetic tape T from slackening.

The magnetic tape cassette 10 includes a pair of shafts 50 that are typically fixed to and project from an inner wall surface 14U of the lower half 14. Each of the shafts 50 penetrates a through hole 44H that is formed along the central axis of each guide roller 44. The guide rollers 44 are axially and rotatably supported around the shafts 50.

The guide rollers 44 are formed by resin such as polyacetal (POM) that is slick and have comparatively high mechanical strength.

Figure 7:
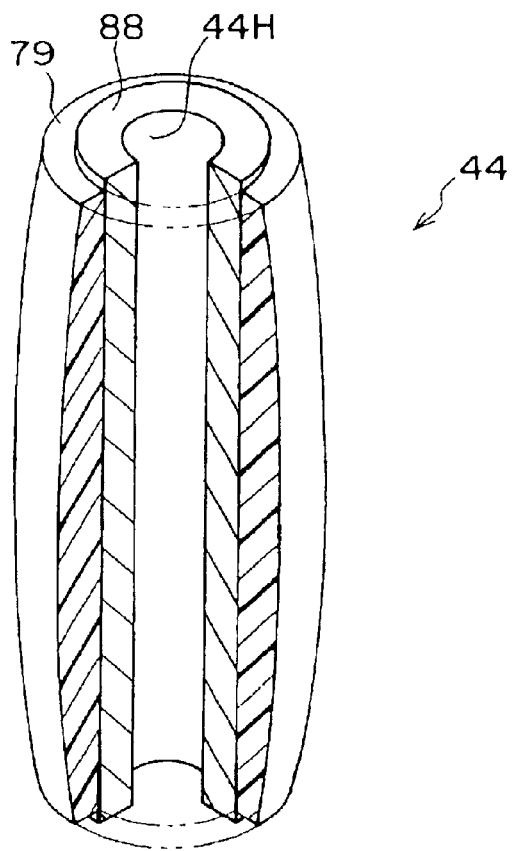
FIG. 7 is a cross-sectional perspective view of a barrel-shaped roller manufactured by injecting the secondary resin.
Figure 8:
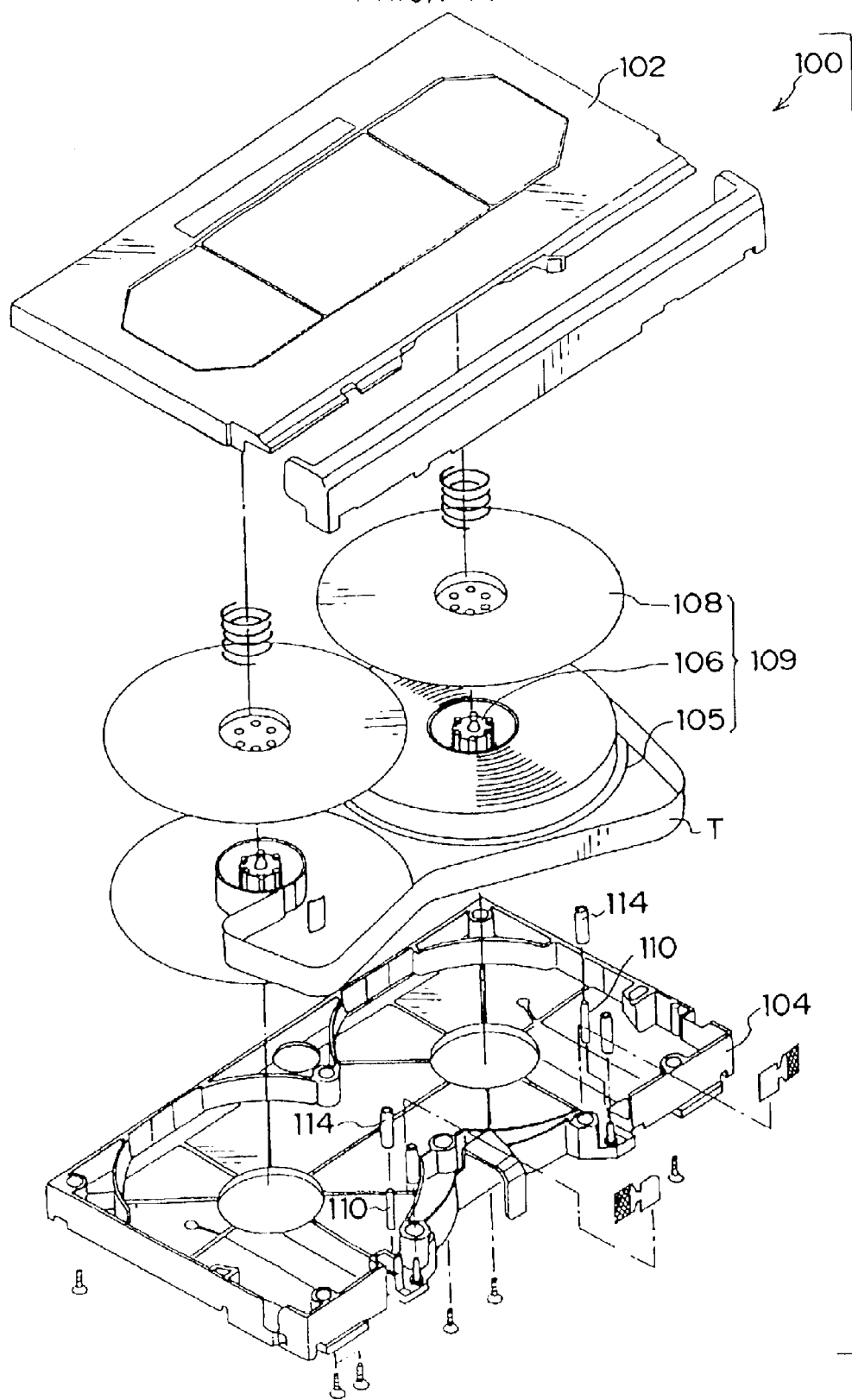
FIG. 8 is a developed perspective view of a conventional magnetic tape cassette.
Figure 9A:
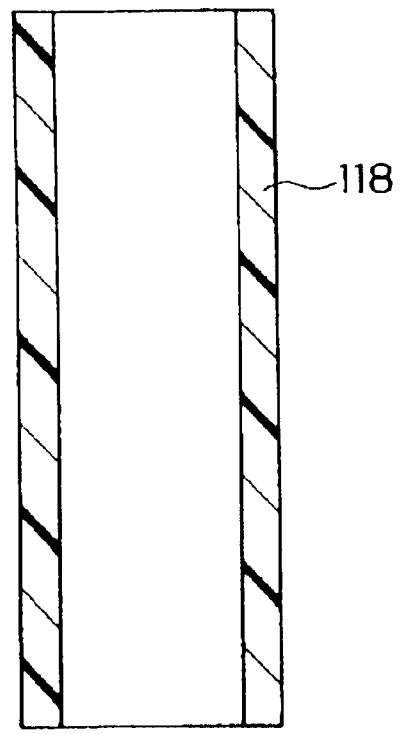
FIG. 9A is a side cross-sectional view of a primary molded product that is formed during manufacture of a conventional barrel-shaped roller.
Figure 9B:
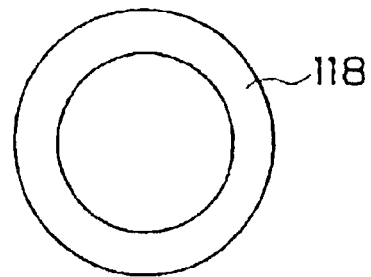
FIG. 9B is a plan view of the primary molded product of FIG. 9A.
Figure 10:
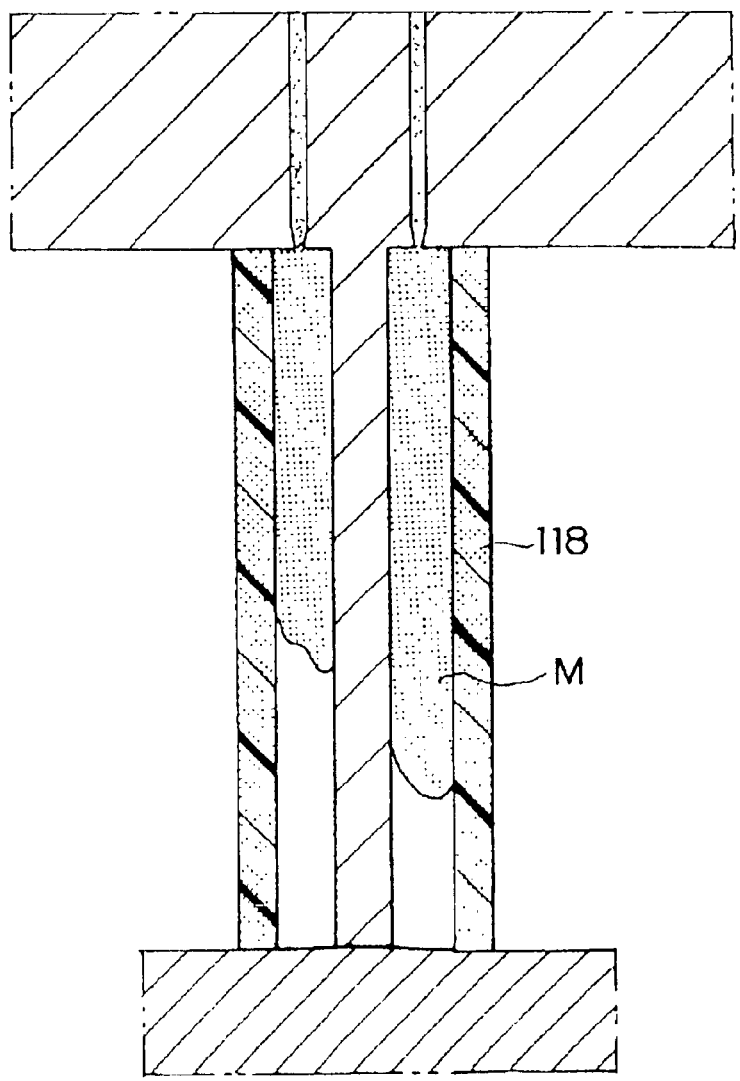
FIG. 10 is a side cross-sectional view showing secondary resin being injected into the primary molded product of FIGS. 9A and 9B.
Figure 11:
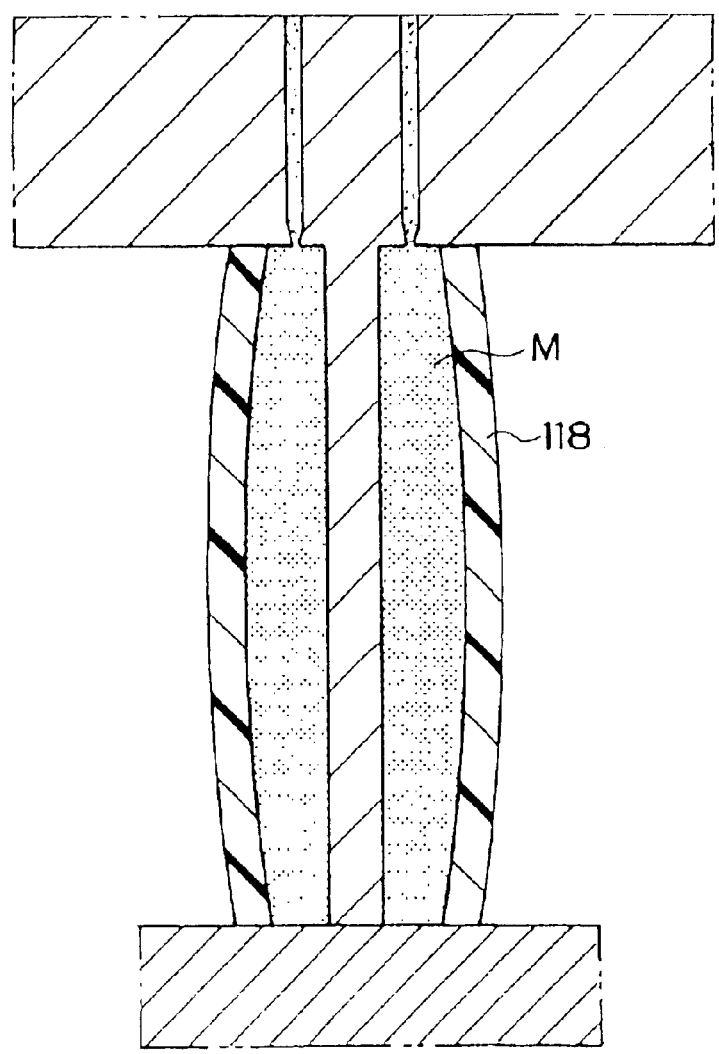
FIG. 11 is a side cross-sectional view of the conventional barrel-shaped roller that is formed by swelling of the primary molded product into a barrel shape due to pressure exerted by injecting the secondary resin.

Each guide roller 44 is injection-molded so that its outer periphery is swollen (see FIG. 7) in order to ensure traveling stability of and efficiently guide the magnetic tape T.

Figure 2:
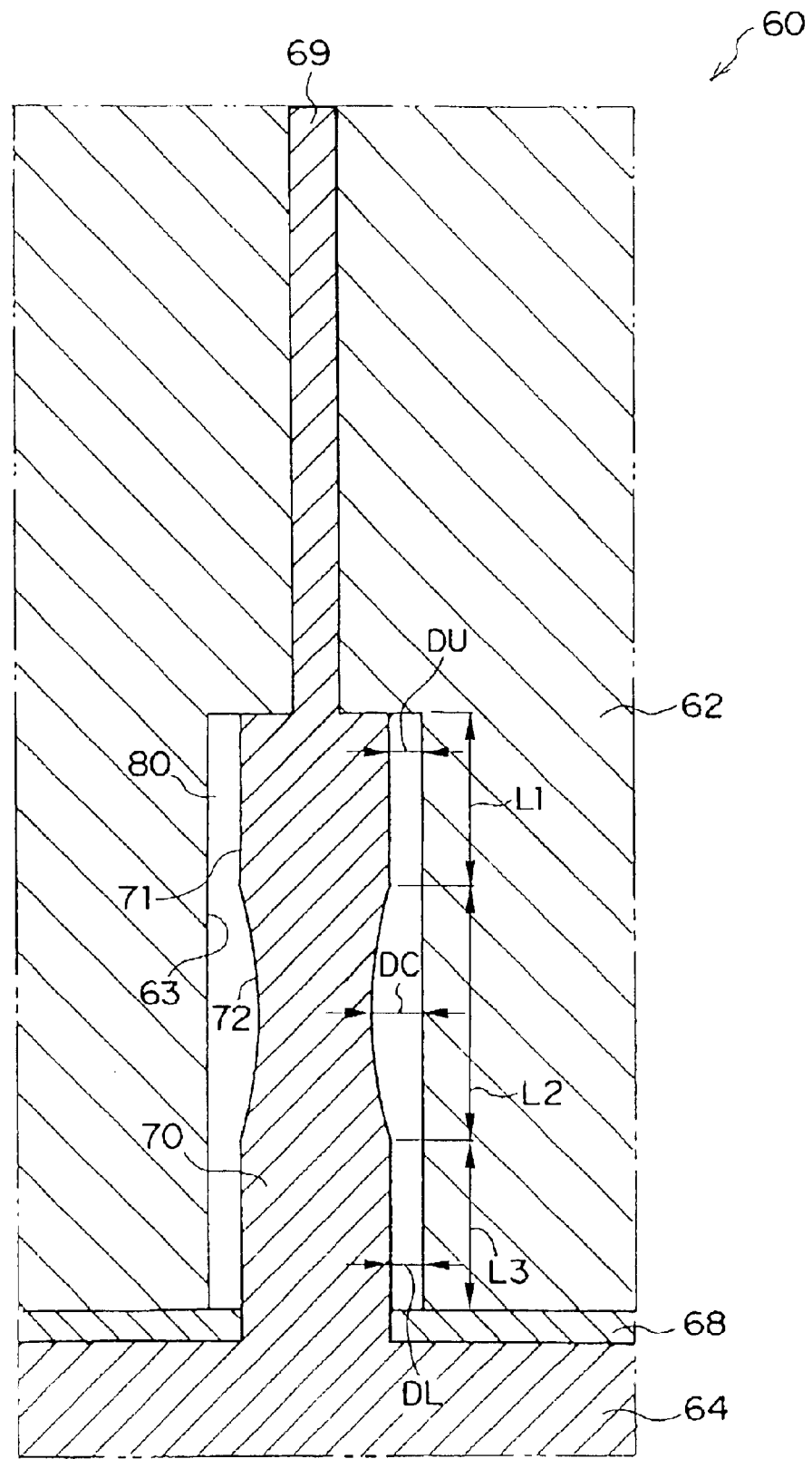
FIG. 2 is a side cross-sectional view of a mold used for manufacturing a barrel-shaped roller.

FIG. 2 shows a metal mold 60 for injection-molding the guide rollers 44. The mold 60 includes a fixed mold 62, which has a flat cylindrical inner peripheral surface 63, and a movable mold 64 that can move vertically.

A cylindrical insert die 70 projects perpendicularly from the movable mold 64 and includes an outer peripheral surface 71. The outer peripheral surface 71 includes a central portion having formed thereat a curved recess 72. When the insert die 70 is seen in cross section, the recess 72 appears as a substantial arc that gradually tapers inward (see FIG. 2).

A pin-like die 69 that is used at the time of secondary molding is disposed on the insert die 70 so as to protrude vertically from the central axis of the insert die 70.

When manufacturing the barrel-shaped guide roller 44 with the mold 60, the movable mold 64 is set in accordance with the fixed mold 62 at a position at which resin is injected (see FIG. 2). Then, molten resin is injected from a gate (not shown) into a cavity 80 formed between the fixed mold 62 and the movable mold 64.

Figure 3:
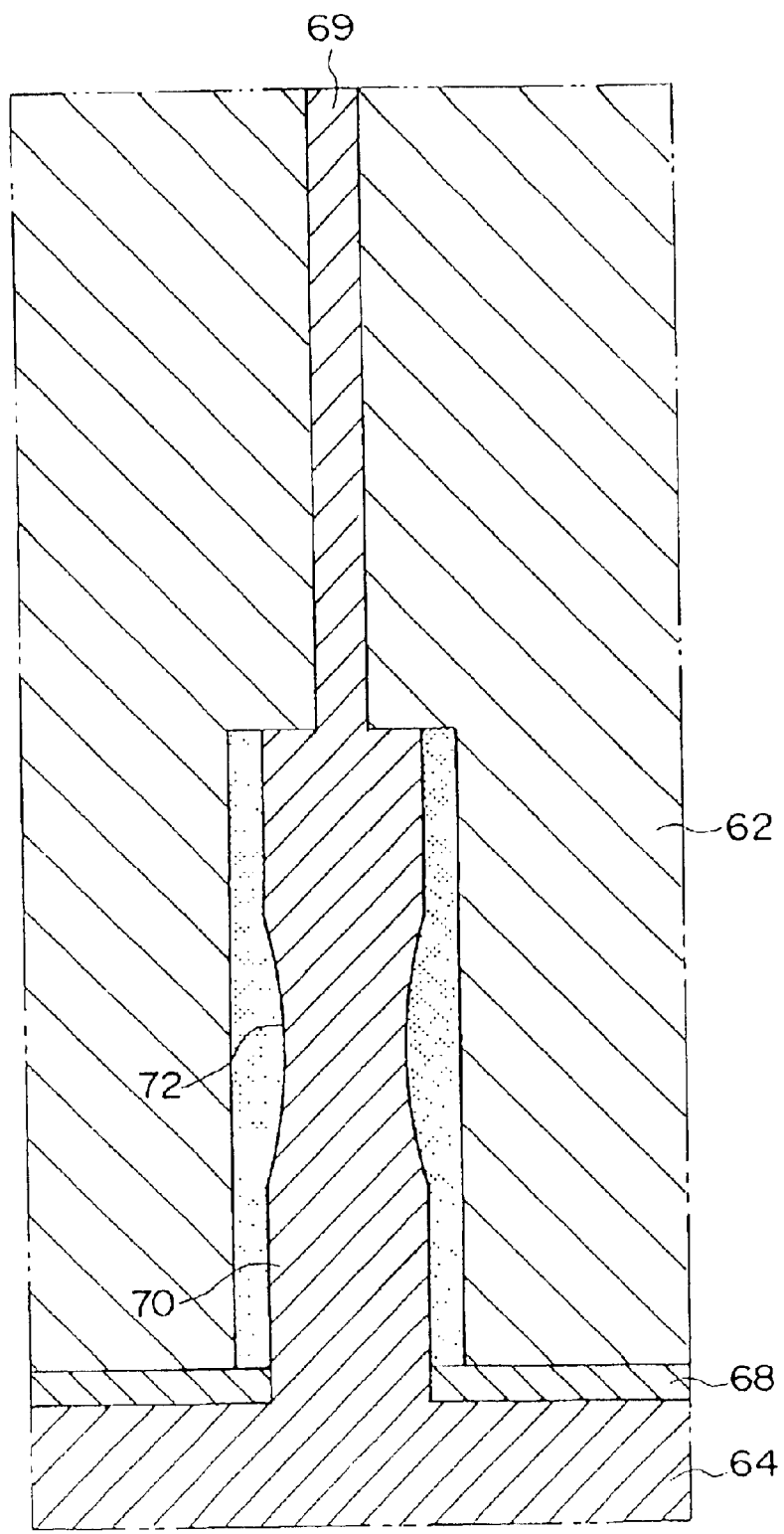
FIG. 3 is a side cross-sectional view showing resin injected into a cavity of the mold.
Figure 4:
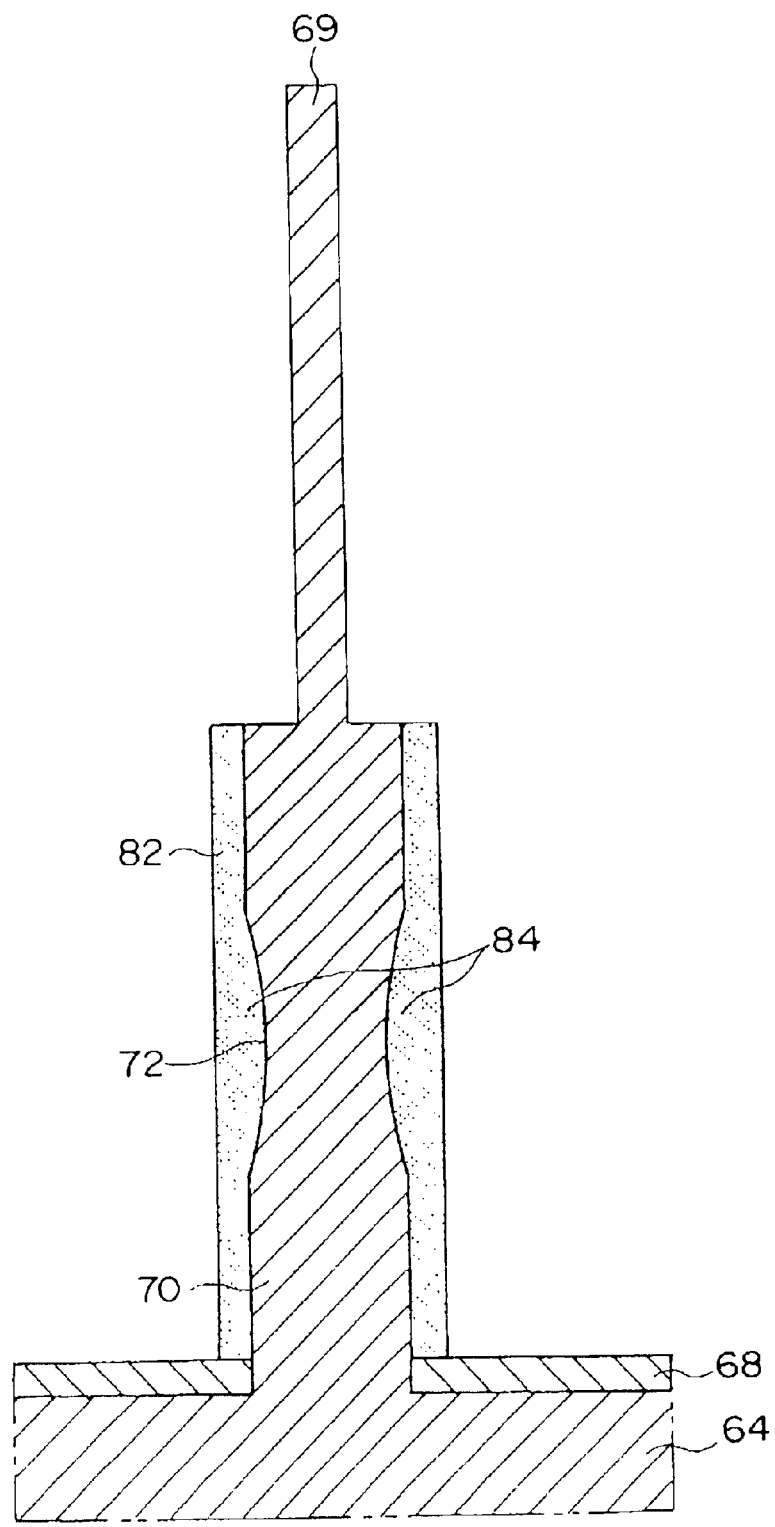
FIG. 4 is a side cross-sectional view of a semi-solidified roller from which a fixing mold has been released.

After the molten resin has been injected (see FIG. 3), a surface of the injected resin solidifies to form a skin layer. A cylindrical semi-solidified roller 82 (see FIG. 4), whose interior has not yet fully solidified, is thereby formed. The fixed mold 62, which is the outer mold is released to thereby free the outer periphery of the semi-solidified roller 82.

The lower end of the freed semi-solidified roller 82 is supported by an ejector plate 68, which is a component of the movable mold 64. Further, an inwardly swelling portion 84 is formed by resin remaining in a space formed by the recess 72.

Figure 5:
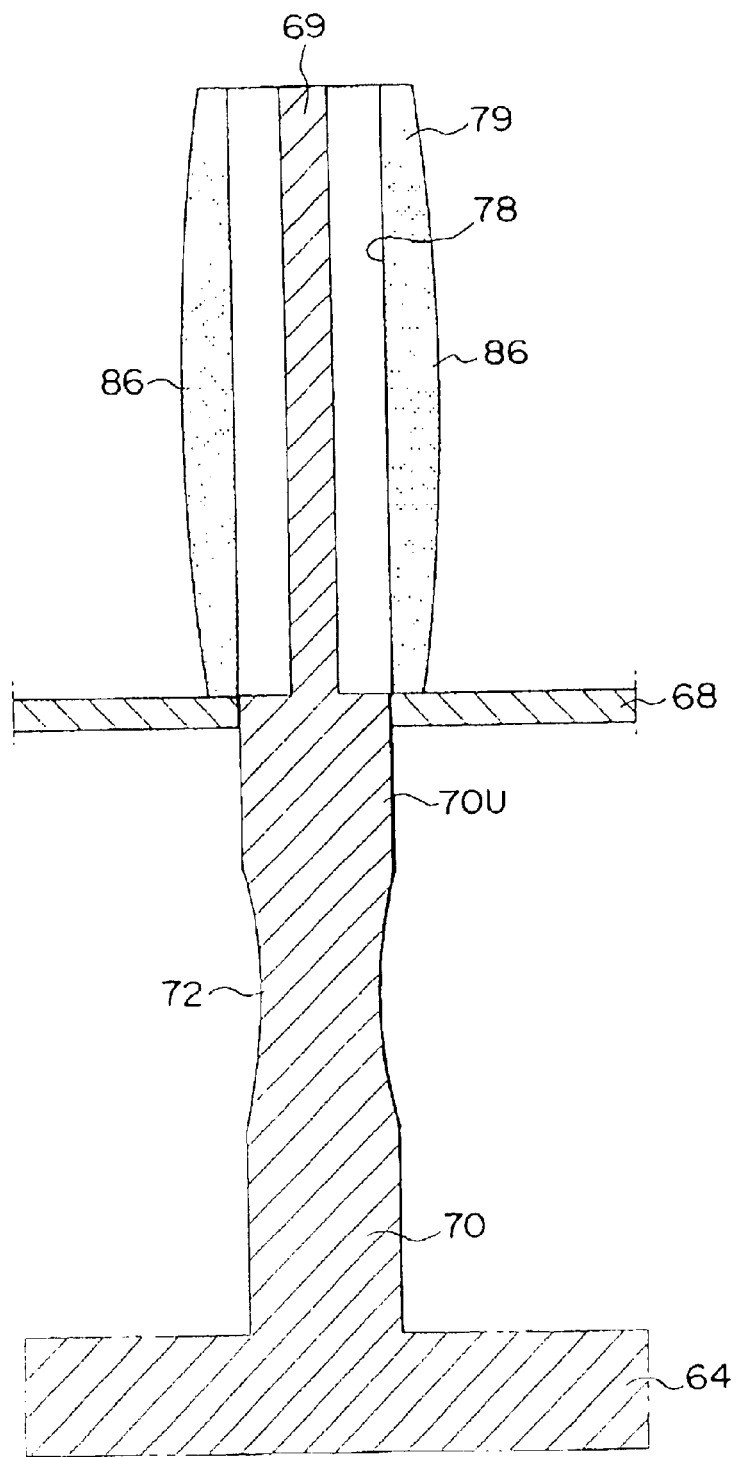
FIG. 5 is a side cross-sectional view of a movable mold that has been pulled from the state shown in FIG. 4.

As shown in FIG. 5, when the ejector plate 68 is lifted up, while the inwardly swelling portion 84 is pressed outwardly by an upper portion 70U, which is disposed above the recess 72 of the insert die 70, and the semi-solidified roller 82 is forcibly ejected from the insert die 70, which is a so-called "die removal by force". As a result, an outwardly swelling portion 86 is formed around the outer periphery of the semi-solidified roller 82, and the semi-solidified roller 82 is formed into a barrel-shape. A through hole 78, whose inner diameter is substantially the same as that of the upper portion 70U, is formed in the roller. Consequently, a primary molded product 79 is finished.

Figure 6:
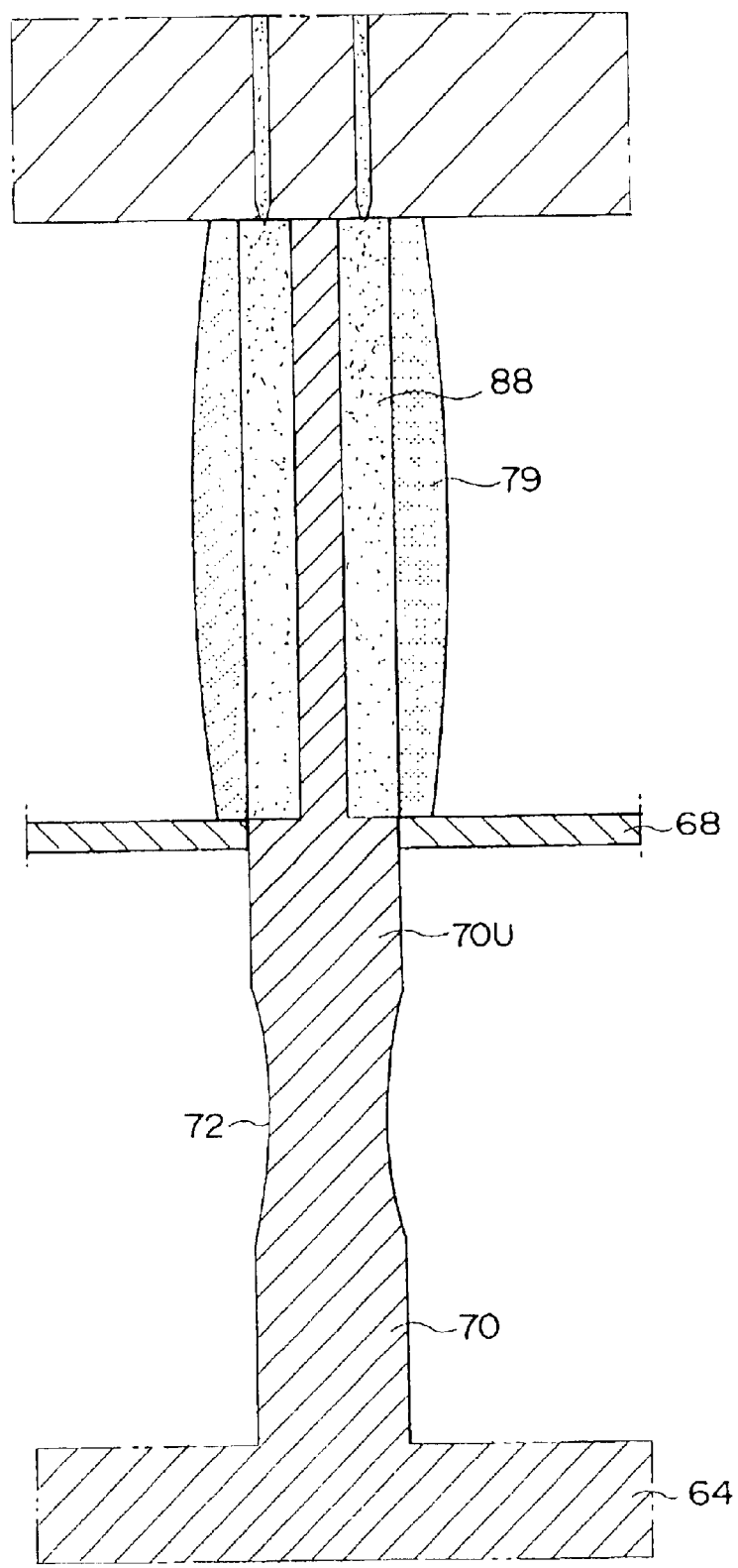
FIG. 6 is a side cross-sectional view showing manufacture of a secondary molded product by injecting secondary resin into a primary molded product.

Thereafter, as shown in FIG. 6, molten resin for secondary molding is injected into the through hole 78 to form a secondary resin portion 88. The secondary resin portion 88 solidifies and is integrated with the primary molded product 79, whereby a barrel-shaped guide roller 44 is formed (see FIG. 7).

It should be noted that the guide roller 44 can be molded by preparing an exclusive mold for molding the secondary molded product and using the exclusive mold to inject secondary resin into the through hole 78 of the primary molded product 79. In this case, since the primary molding process and the secondary molding process are respectively carried out with mutually different molds, a secondary molded product can be formed during the molding of the primary molded product, whereby manufacturing efficiency can be improved. Further, since the pin-like die 69 does not need to be disposed at the insert die 70, the metal mold can be structured more simply.

The size of the cavity 80 is determined on the basis of the desired size of the outwardly swelling portion 86. With reference to FIG. 2, an example of the cavity 80 will be explained. A length L2 of the recess 72 is 7.5 mm. A distance DC between the deepest portion of the recess 72 and the inner peripheral surface 63 of the fixed mold 62 is 0.5 mm. A length L1 from the uppermost end of the insert die 70 to the uppermost end of the recess 72 is 5 mm. A distance DU between the upper portion 70U of the insert die 70 and the inner peripheral surface 63 is 0.4 mm. A length L3 from the lowermost end of the recess 72 and the ejector plate 68 is the same as L1 (i.e., 5 mm). A distance DL between the insert die 70 and the inner peripheral surface 63 is the same as DU (i.e., 0.4 mm).

As described above, in accordance with the present embodiment, an excellent barrel-shaped roller can be formed efficiently and quickly in a more simple manner.

An embodiment of the invention has been described above. However, the invention is not limited to this embodiment, and can be modified without departing from the spirit and the scope of the invention. For example, methods of manufacturing barrel-shaped rollers for tape cassettes other than magnetic tape cassettes can be included in the scope of the invention.

What is claimed is:

1. A method of manufacturing a roller including an outer periphery that swells in a barrel-like manner, comprising the steps of:
    (a) forming a hollow cylindrical body that includes a uniform outer peripheral surface and an inner peripheral surface that swells inwardly;
    (b) pressing the swollen portion of the inner peripheral surface outwardly to form a product; and
    (c) forming the product into the roller.

2. The method of claim 1, wherein step (c) comprises injecting resin into the hollow portion of the cylindrical body after step (b).

3. The method of claim 1, wherein (b) results in the swollen portion of the inner peripheral surface being pressed outwardly permanently.

4. The method of claim 1, wherein step (b) is carried out before the cylindrical body has completely solidified.

5. The method of claim 4, wherein the cylindrical body is molded with an insert die, which includes a central portion having formed thereat a curved recess, and an outer mold, which includes an inner peripheral surface that defines an outer periphery of a cavity formed by joining the outer mold with the insert die, the inner peripheral surface of the outer mold being uniformly flat.

6. The method of claim 5, wherein the outer mold is released after the step (a).

7. The method of claim 6, wherein step (b) is carried out by moving the cylindrical body along the insert die.

8. The method of claim 7, wherein the cylindrical body comprises resin.

9. The method of claim 8, wherein step (c) comprises injecting resin into the hollow portion of the cylindrical body after step (b).

10. A method of manufacturing a roller including an outer periphery that swells in a barrel-like manner, the method using an insert die and an outer mold, the outer mold including an inner peripheral surface that defines an outer periphery of a cavity formed by joining the outer mold with the insert die, with the inner peripheral surface of the outer mold being cylindrical and uniformly flat, the method comprising the steps of:
    (a) injecting material into the cavity and disposing the material along an outer peripheral surface of the insert die to thereby form a hollow cylindrical body that includes a uniform outer peripheral surface and an inner peripheral surface including a portion that swells inwardly;
    (b) releasing the outer mold;
    (c) pressing the swollen portion of the inner peripheral surface outwardly to form a product; and
    (d) forming the product into the roller.

11. The method of claim 10 wherein step (d) comprises injecting resin into the hollow portion of the cylindrical body after step (c).

12. The method of claim 10, wherein (c) results in the swollen portion of the inner peripheral surface being pressed outwardly permanently.

13. The method of claim 10, wherein step (c) is carried out before the cylindrical body has completely solidified.

14. The method of claim 13, wherein the insert die includes a central portion having formed thereat a curved recess.

15. The method of claim 14, wherein step (c) is carried out by moving the cylindrical body along the insert die.

16. The method of claim 15, wherein the cylindrical body comprises resin.

17. The method of claim 16, wherein step (d) comprises injecting resin into the hollow portion of the cylindrical body after step (c).

* * * * *